June 5, 1956

W. F. HOLIN 2,748,721

LOCOMOTIVE TRUCK

Filed Aug. 27, 1952

Inventor
William F. Holin
By
Willets, Helmig & Baillio
Attorneys

June 5, 1956 W. F. HOLIN 2,748,721
LOCOMOTIVE TRUCK
Filed Aug. 27, 1952 4 Sheets-Sheet 2

Inventor
William F. Holin
By Willits, Helmig & Baillio
Attorneys

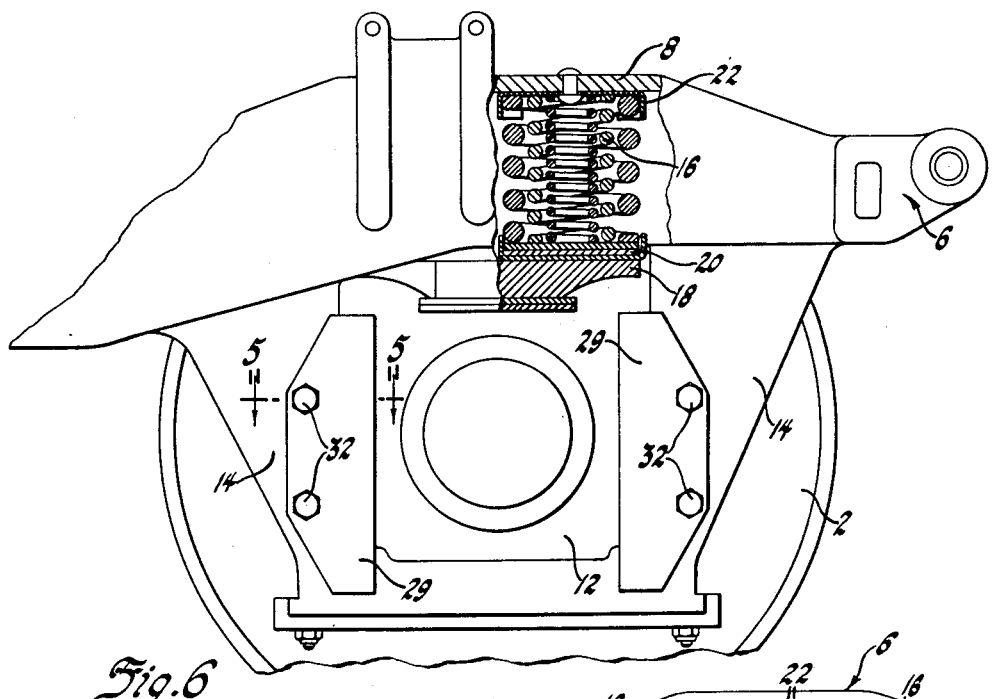
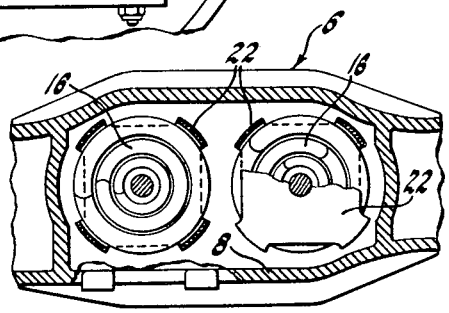
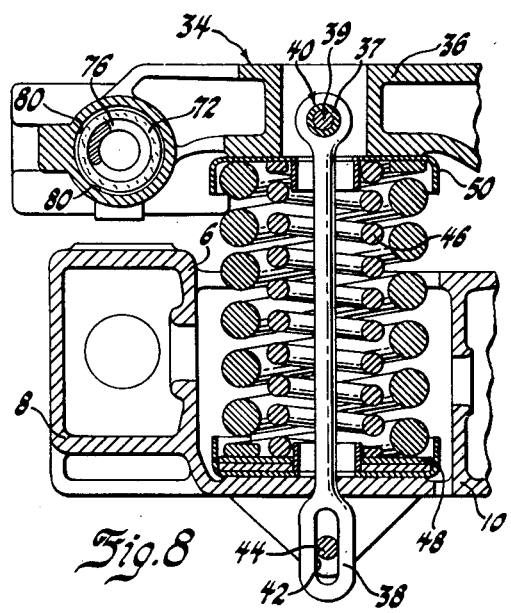
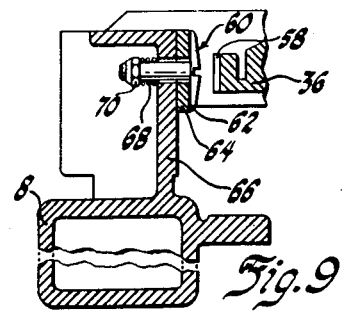

June 5, 1956 W. F. HOLIN 2,748,721
LOCOMOTIVE TRUCK
Filed Aug. 27, 1952 4 Sheets-Sheet 4

Inventor
William F. Holin
By Willits, Helmig & Baillie
Attorneys

United States Patent Office 2,748,721
Patented June 5, 1956

2,748,721

LOCOMOTIVE TRUCK

William F. Holin, Riverside, Ill., assignor to General Motors Corporation, Detroit, Mich., a corporation of Delaware Application August 27, 1952, Serial No. 306,615

9 Claims. (Cl. 105—193)

This invention relates generally to locomotive traction trucks and more particularly to means to suspend the bolster of the truck on the frame of the truck in combination with means to damp vertical and lateral oscillation of the bolster with respect to the frame of the locomotive truck. It further relates to the provision of resilient means to limit the lateral and longitudinal movement of the bolster relative to the frame of the locomotive.

It has been found that better riding qualities may be obtained for locomotives by utilizing a traction truck whose frame and bolster are suspended by springs which, when loaded, create relatively low frequency and high amplitude vibrations in the sprung bodies supported thereby. By using this type of suspension structure, however, there is a much greater tendency to develop harmonic build-up in the locomotive truck or the locomotive body which causes "galloping" of the truck frame with respect to the bolster. This "galloping" or harmonic build-up of itself gives poor ride quality and under extreme conditions may become dangerous.

It therefore becomes an object of this invention to provide damping means to be used in combination with springs having high amplitude, low frequency vibration characteristics to prevent harmonic build-up in a locomotive truck.

It is a further object of this invention to provide damping means which change the high amplitude, low frequency vibrations of the springs suspending the bolster on the locomotive truck into low frequency, low amplitude vibrations which may easily be absorbed by the mass of the locomotive body carried by the truck.

It is a further object of this invention to provide suspension means for locomotive trucks combined with unique damping means to provide better riding qualities in such trucks.

It is a further object of this invention to provide lateral limiting means for a truck bolster relative to a truck frame in combination with unique damping means to damp out vertical and lateral oscillations of the truck bolster with respect to the truck frame.

Another object of this invention is to provide a truck whose structure is simple and provides ease of manufacture, and whose parts are easily accessible for replacement and repair.

In the drawings:

Figure 6 is an enlarged portion of the side elevation of Figure 2 and shows certain details including a broken away portion for indicating the spring suspension means between the journal box and the frame.

Figure 7 is an enlarged view of a portion of the plan view of Figure 1 and shows the details of the seats for the springs which are interposed between the journal box and the frame side members.

Figure 8 is a sectional view taken along the line 8—8 of Figure 2 and along the line 8—8 of Figure 4 and shows one of the vertical bolster anchorage means and spring assemblies between the bolster and the frame side member which serves to resiliently suspend the bolster from the frame.

Figure 9 is a section taken along the line 9—9 of Figure 1 and shows in detail the unique snubbing elements to limit the lateral movement of the bolster with respect to the frame.

Figure 1:
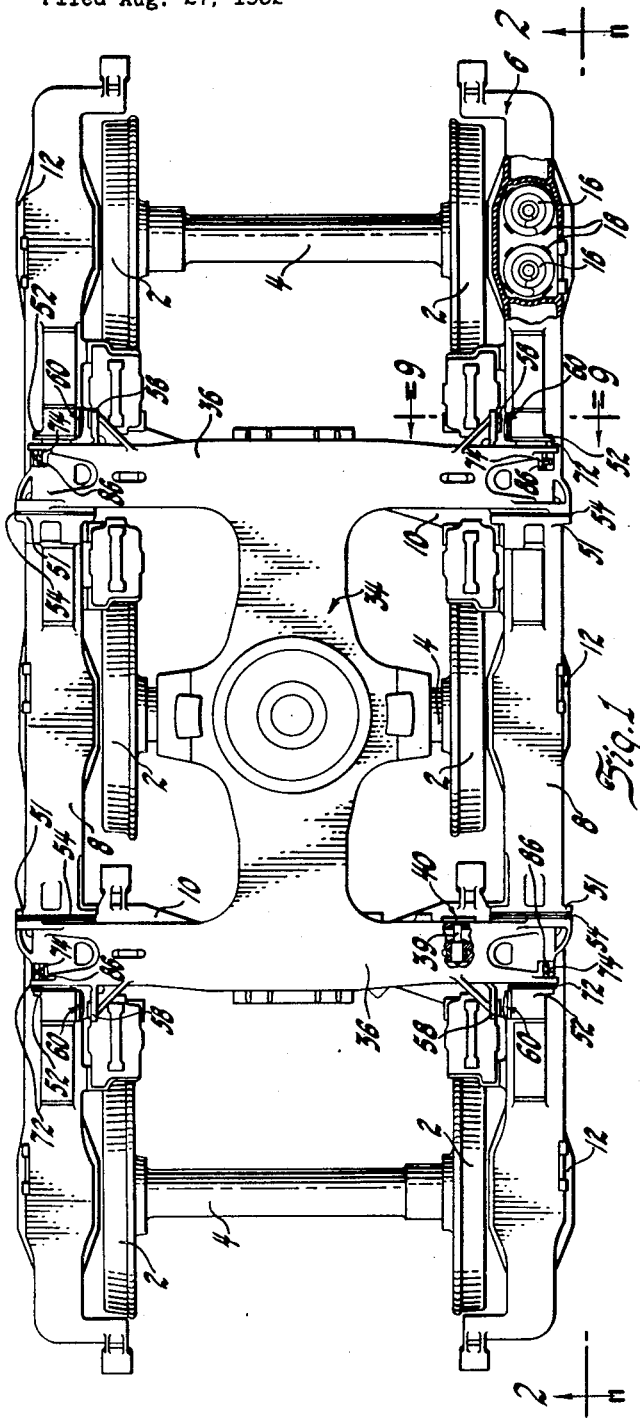
Figure 1 is a plan view of a locomotive traction truck showing the bolster supported upon the side frame members of the truck and the side frame members supported on axles and wheels of the truck.
Figure 2:
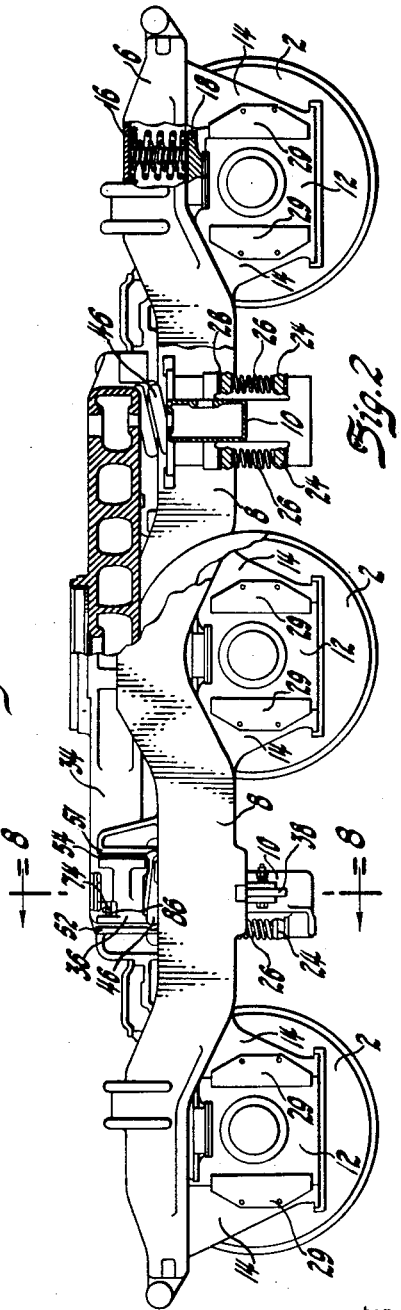
Figure 2 is a side elevation of the truck taken along line 2—2 of Figure 1 and includes a partial section which shows the structure of the bolster and also the details for resiliently supporting one end of the traction motors on the frame.

Referring now to Figures 1 and 2 a locomotive traction truck is shown including the usual wheels 2 and axles 4 supported thereby. A frame 6 including side frame members 8 and transom members 10 is supported on the axles 4 by means of the journal boxes 12 residing between the pedestals 14 attached to the underside of the side frame members 8. In order to resiliently suspend the side frame members 8 on the journal boxes 12 sets of concentric helical springs 16 are interposed between the top of the journal boxes and the side frame members 8. The details of this spring suspension are more particularly shown in Figure 6 and Figure 7 wherein it may be seen that each of these spring assemblies includes a spring seat assembly 18 attached to the journal box 12, a spring shim 20, the aforementioned concentric springs 16 and an upper spring seat 22 attached to the side frame member 8.

Figure 4:
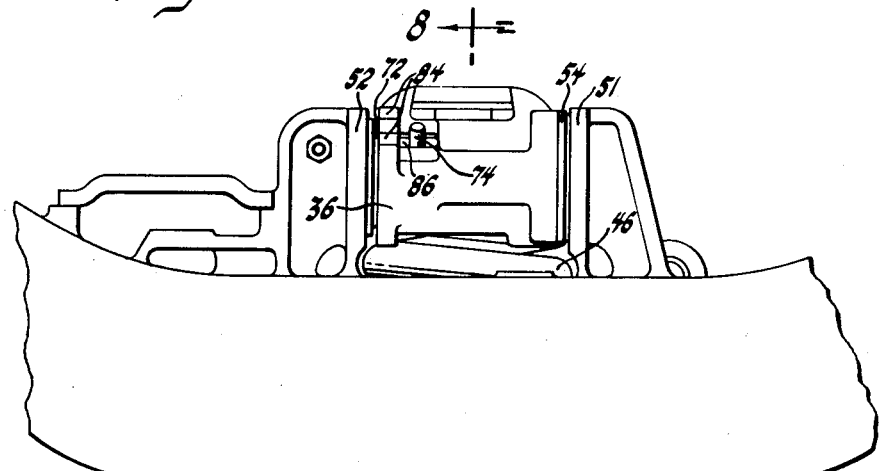
Figure 4 is an enlarged portion of the side elevation of Figure 2 and also shows one arm of the bolster supported on the side frame of the locomotive with the unique damping means attached.
Figure 5:
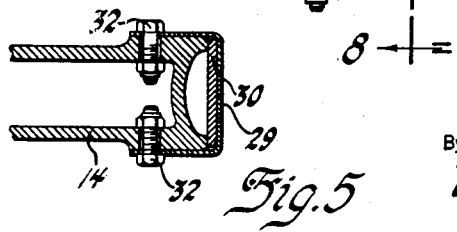
Figure 5 is a section taken along the line 5—5 of Figure 6 and shows in detail the liner assembly attached to a pedestal of the frame for guiding the journal box of the locomotive.

Returning now to Figure 2 and also observing Figure 4, means for resiliently mounting one end of each of the traction motors are shown attached to lower appendages of the transom frame members 10. These resilient means include for each traction motor a spring seat assembly 24, a coil spring 26 and upper spring support 28. The various traction motors are supported partly by the axles 4 and partly by the resilient spring means just described. Also in Figure 5 the details of one of the pedestal liner assemblies are illustrated and include a liner member 29, a filler plate 30, and bolt and nut assemblies 32 to fasten the liner 29 to the sides of the pedestals 14.

Referring again to Figures 1 and 2 it will be seen that a bolster 34 having longitudinally spaced laterally extending arms 36 is supported on the side frame members 8 at the extremities of arms 36. For details showing one of the means for supporting the bolster 34 on the side frame members 8 reference may be had to Figures 3, 4 and 8, in which it is seen that a suspension bar 38 is pivotally attached to one end of the bolster arm 36 by means of a pivot pin assembly 40. The pin assembly 40 includes an outer bearing shell 37 surrounding the pin 39 which is locked in place in wall portions of the bolster arm by the locking plate 41 and the bolts 43. The other end of the suspension bar 38 is provided with a slot 42 adapted to slidingly engage the shank of a bolt 44. The bolt 44 is fastened by a stabilizing spring 45 and a self-locking nut 47 to a clevis structure appended to the under side of the transom frame 10. Interposed between the transom frame members 10 and the arm 36 of the bolster 34 and encircling the suspension rod 38 is a concentric spring assembly 46. The spring assembly 46 engages a lower spring seat assembly 48 on the transom member 10 and an upper spring seat assembly 50 which is attached to the arm 36 of the bolster 34. The structure shown in Figure 8 is repeated for each of the extremities of the bolster arms 36. It will be noticed that the manner of connection of the suspension bars 38 allows limited vertical movement of the bolster 34 relative to frame 6, and such connections also provide for a certain amount of lateral motion of the bolster with respect to the frame.

Figure 3:
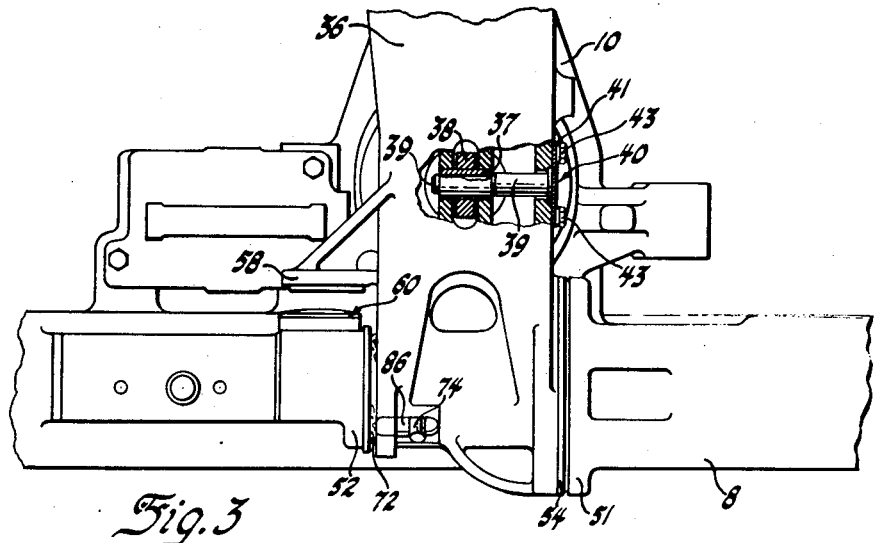
Figure 3 is an enlarged portion of the plan view of Figure 1 at one of the points where the bolster is supported to the side frame members of the locomotive and shows in more detail the unique damping means and also the means for transmitting movement of the frame to the bolster.

Included as one of the unique features of the traction truck are sets of resilient snubber elements for limiting the lateral movement of the bolster with respect to the truck frame. In Figure 3 a laterally outwardly facing stop 58 is shown attached to the bolster arm 36. The stop 58 is adapted to engage one of the snubber elements 60 after limited lateral movement of the bolster 34 with respect to the frame 6. The details of this snubber element are shown in Figure 9 and comprise a bolt 62 having a large, thin, convex head and a resilient cushion 64 placed between the convex head and an upstanding portion 66 attached to the side frame member 8. The shank of the bolt 62 passes through a hole in the resilient cushion 64 and also through a hole in the upstanding portion 66. Located on the opposite side of the upstanding portion 66 from the resilient cushion 64 is a compressed coil spring 68 which surrounds the shank of the bolt 62 and is maintained in compression against the upstanding portion 66 by a self-locking nut 70. The compression spring 68 stabilizes the snubber element when it is not in snubbing contact with the bolster arm 36.

Figure 10:
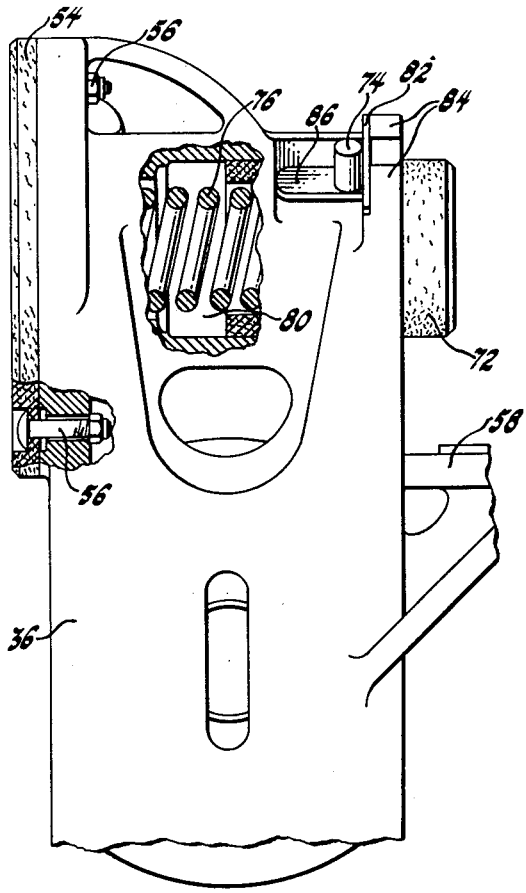
Figure 10 is an enlarged portion of an extremity of one of the bolster arms and serves to illustrate the unique friction means in their surrounding bolster arm structure.
Figure 11:
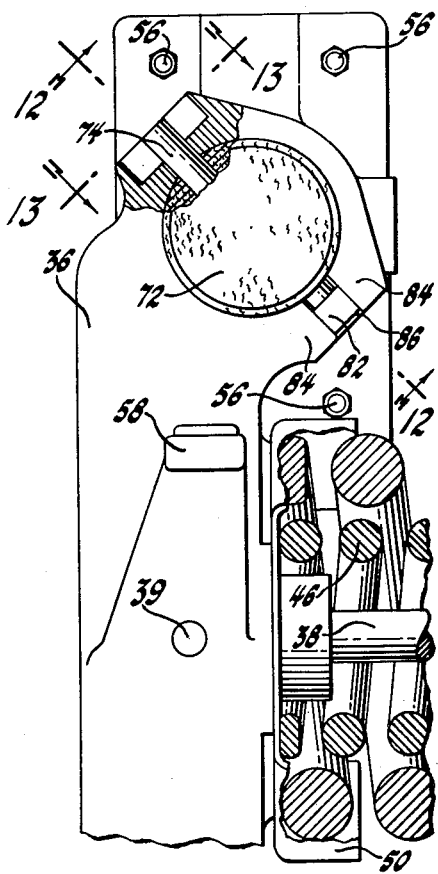
Figure 11 is a side view of the extremity of the bolster of Figure 10 and illustrates more clearly the guide pin means for slidingly maintaining the friction elements within the bolster arm extremities.
Figure 12:
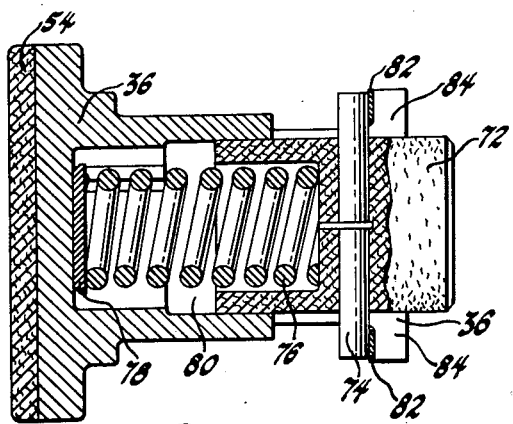
Figure 12 is taken along line 12—12 of Figure 11 and is a detailed showing in section of one of the friction elements in its surrounding bolster structure.
Figure 13:
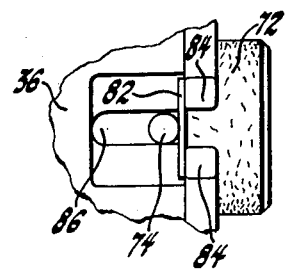
Figure 13 is taken along the line 13—13 of Figure 11 and shows the detail of one of the slotted portions of the bolster extremities for guiding the friction damping means including a stop pin pad to limit the outer movement of the damping means.

Turning now to Figures 3 and 4 which represent enlarged views of portions of Figure 1 and Figure 2, one of the unique means for damping lateral and vertical oscillations of the bolster with respect to said locomotive frame will be observed. In Figure 3 and Figure 4 the side members 8 are shown provided with longitudinally end facing chafing plates 51, preferably of steel, and longitudinally center facing friction plate assemblies 52. On the bolster arm 36 and adjacent one of the chafing plates 51 is a mating chafing plate 54 attached to the bolster arm 36 in a manner more particularly shown in Figure 10. In Figure 10 it will be seen that the chafing plate 54 is attached to the bolster arm 36 by means of bolt and nut assemblies 56. The heads of the bolts of the bolt and nut assemblies are recessed into the chafing plate 54 and the shank of the bolt extends through a wall of the bolster arm 36 so that the chafing plate may be drawn up tightly by the nut of the bolt and nut assembly. The chafing plates 54 are preferably made from shock and noise absorbing non-metallic material since they engage the steel chafing plates 51. A small amount of clearance is provided between the chafing plates 51 and 54 when no tractive effort is being exerted in either direction. This clearance allows a certain amount of limited longitudinal movement of the frame with respect to the bolster and insures that the truck frame will exercise a "pulling" action on the bolster and locomotive body when tractive effort is being applied. This "pulling" action is considered to be one of the features of this truck, because it has been found that such means in combination with the other features of the truck give a better riding truck with less wear on the abutting movable members.

The details of one of the unique friction damping means including its surrounding structure are best shown in Figures 10, 11, 12 and 13 and include a plunger 72 of frictional brake lining material having a pin 74 molded therein. The plunger 72 is cylindrical in form and is adapted to slidingly reside in a suitable hole 80 formed in the end of the bolster arm 36. Interposed between the inner wall of the bolster arm 36 and the plunger 72 is a helical spring 76 which is seated on a spring shim 78 attached to the aforementioned wall. The plunger 72 is inserted in the cylindrical hole 80 in the end of the bolster arm 36 after the helical spring 76 has been placed therein. The plunger 72 is then pressed to place the spring 76 under compression so as to allow a pair of pads 82 to be placed across pairs of projections 84 on the bolster arm 36 to maintain the spring plunger assembly within the end of the arm 36 and to provide upper and lower stops for the pin 74. As may be seen in Figure 13 the pin 74 rides in a slot 86 which allows the plunger 72 to move in and out of the hole 80 under the action of the spring 76 when the bolster arm 36 changes its longitudinal position with respect to the frame 6 of the traction truck. The plungers 72 are maintained in frictional engagement with the chafe plates 52 by the springs 76 and provide the damping which has been found necessary in order to prevent "galloping" and harmonic action build-up.

It will readily be appreciated that a new combination for traction truck has been described which allows the use of supporting suspension springs of low frequency, high amplitude characteristics, to give better riding qualities and which prevents the harmonic build-up and "galloping" of the truck which is usually associated with springs of the character just described.

I claim:

1. A locomotive truck comprising a plurality of axles including wheels thereon, a frame composed of rigidly connected longitudinal side members and transverse transom members resiliently supported on said axles, a bolster adapted to support the locomotive and having longitudinally spaced laterally extending arms resiliently supported directly on the side members of said frame for lateral swinging movement relative thereto, and longitudinally acting spring-loaded friction means interposed between said bolster and said frame to damp lateral and vertical oscillations of said bolster with respect to said frame.

2. A locomotive traction truck comprising a frame composed of rigidly connected longitudinal side members and transverse transom members, a plurality of axles including wheels attached thereto and journal elements supporting said frame at the side members thereof, equalizer coil springs interposed between said journal elements and said frame side members and supporting said side frame members, a bolster on which the locomotive is mounted having longitudinally spaced laterally extending arms, helical spring means carried by said frame supporting said bolster adjacent the ends of the laterally extending arms thereof for swinging movement relative to said frame, longitudinally end facing chafing plates carried by said frame side members opposed by longitudinally center facing chafing plates carried by said bolster members to transmit movement of said frame to said bolster and to limit longitudinal movement of said bolster with respect to said frame, laterally inwardly facing snubber elements carried by said frame side members opposed by laterally outwardly facing stop elements carried by each of said bolster arms to limit the lateral movement of said bolster with respect to said frame, longitudinally center facing friction plates carried by said frame side members, and longitudinally end facing spring loaded friction elements carried by the extremities of each of said bolster arms to frictionally cooperate with said longitudinally center facing friction plates and damp out the lateral and vertical oscillations of said bolster with respect to said frame, said friction devices thereby preventing galloping of said truck frame with respect to said bolster.

3. A locomotive truck comprising a plurality of axles including wheels thereon, a rigid frame composed of longitudinal side members and transverse transom members and resiliently supported on said axles, a bolster adapted to support the locomotive and having longitudinally spaced laterally extending arms resiliently supported at the extremities thereof on the longitudinal side members of said frame for lateral swinging movement relative thereto, and friction means to damp lateral and vertical oscillation of said bolster with respect to said frame and including longitudinally end facing chafing plates carried by said frame and opposed by longitudinally center facing chafing plates carried by the extremities of said arms to transmit longitudinal movement of said frame to said bolster and to limit the longitudinal movement of said frame with respect to said bolster, and longitudinally center facing friction plates carried by said frame side members and opposed and engaged by longitudinally end facing spring loaded friction elements carried by said extremities.

4. A locomotive truck comprising a plurality of axles including wheels thereon, a rigid frame composed of longitudinal side members and transverse transom members and resiliently supported on said axles, a bolster adapted to support the locomotive and having longitudinally spaced laterally extending arms resiliently supported at the extremities thereof on the longitudinal side members of said frame for swinging lateral movement relative thereto, and friction means to damp lateral and vertical oscillation of said bolster with respect to said frame and including longitudinally end facing chafing plates carried by said frame and opposed by longitudinally center facing chafing plates carried by the extremities of said arms to transmit longitudinal movement of said frame to said bolster and to limit the longitudinal movement of said frame with respect to said bolster, and longitudinally center facing steel friction plates carried by said frame side members and opposed and engaged by longitudinally end facing spring loaded molded brake lining elements on said extremities of material dissimilar to that of said steel friction plates.

5. A locomotive truck comprising a plurality of axles including wheels thereon, a rigid frame resiliently supported on said axles, a bolster adapted to support the locomotive and having longitudinally spaced laterally extending arms resiliently supported at the extremities thereof on said frame for lateral swinging movement relative thereto, and friction means to damp lateral and vertical oscillation of said bolster with respect to said frame and including sets of longitudinally facing opposed plates, each set having the extremity of one of said arms interposed therebetween, longitudinally end facing spring loaded friction elements provided on said extremities and engaging the longitudinally center facing plates in said sets, and longitudinally center facing chafing plates on said extremities engageable with the longitudinally end facing plates on said frame.

6. A locomotive truck comprising a plurality of axles including wheels thereon, a rigid frame composed of longitudinal side members and transverse transom members and resiliently supported on said axles, a bolster adapted to support the locomotive and having longitudinally spaced laterally extending arms resiliently supported at the extremities thereof on the longitudinal side members of said frame for lateral swinging motion relative thereto, longitudinally end facing chafing plates carried by said frame and opposed by longitudinally center facing chafing plates carried by the extremities of said arms to transmit longitudinal movement of said frame to said bolster and to limit the longitudinal movement of said frame with respect to said bolster, longitudinally center facing friction plates carried by said frame side members and opposed and engaged by longitudinally end facing spring loaded friction elements carried by said extremities, and laterally inwardly facing snubber elements carried by said frame side members opposed by laterally outward facing stop elements carried by each of said bolster arms to limit the lateral movement of said bolster with respect to said truck frame.

7. A locomotive truck comprising a plurality of axles including wheels thereon, a rigid frame composed of longitudinal side members and transverse transom members and resiliently supported on said axles, a bolster adapted to support the locomotive and having longitudinally spaced laterally extending arms resiliently supported at the extremities thereof on the longitudinal side members of said frame for lateral swinging movement relative thereto, longitudinally end facing chafing plates carried by said frame and opposed by longitudinally center facing chafing plates carried by the extremities of said arms to transmit longitudinal movement of said frame to said bolster and to limit the longitudinal movement of said frame with respect to said bolster, longitudinally center facing friction plates carried by said frame side members and opposed and engaged by non-rotatable longitudinally end facing spring loaded friction elements, laterally inwardly facing snubber elements carried by said frame side members opposed by laterally outward facing stop elements carried by each of said bolster arms to limit the lateral movement of said bolster with respect to said truck frame, said snubber elements including a bolt having a large, thin, convex head, a resilient cushion element under said head, said bolt extending freely through an aperture in said frame, a self locking nut on said bolt positioned in spaced relationship to said frame, and a compression spring interposed between said nut and said frame maintaining constant pressure between said bolt head and said cushion element and between said cushion element and said frame to stabilize said snubber element when not in contact with said bolster.

8. A locomotive truck comprising a plurality of axles including wheels thereon, a rigid frame composed of longitudinal side members and transverse transom members and resiliently supported on said axles, a bolster adapted to support the locomotive and having longitudinally spaced laterally extending arms resiliently supported at the extremities thereof on the longitudinal side members of said frame for lateral swinging movement relative thereto, friction means interposed between said bolster and frame to damp lateral oscillations of said bolster relative to said frame, and laterally inwardly facing resilient snubber elements carried by said frame side members opposed by laterally outward facing stop elements carried by each of said bolster arms to limit the lateral movement of said bolster with respect to said frame, said resilient snubber elements including a bolt having a large, thin, convex head, a resilient cushion element under said head, said bolt extending freely through an aperture in said frame, a self locking nut on said bolt positioned in spaced relationship to said frame, and a compression spring interposed between said nut and said frame maintaining constant pressure between said bolt head and said cushion element and between said cushion element and said frame to stabilize said snubber element when not in snubbing contact with said bolster.

9. A locomotive truck comprising a plurality of axles including wheels thereon, a rigid frame composed of longitudinal side members and transverse transom members and supported on said axles, equalizer coil springs interposed between said axles and said frame side members to provide resiliency in the support of said frame by said axles, an H-shaped bolster adapted to support the locomotive and having longitudinally spaced laterally extending arms supported at the extremities thereof on the longitudinal side members of said frame for lateral swinging movement relative thereto, said extremities and said frame having interposed therebetween supporting coil springs, longitudinally end facing chafing plates carried by said frame and opposed by longitudinally center facing chafing plates carried by the extremities of said arms to transmit longitudinal movement of said frame to said bolster and to limit the longitudinal movement of said frame with respect to said bolster, longitudinally center facing friction plates carried by said frame side members and opposed and engaged by non-rotatable longitudinally end facing spring loaded friction elements, and laterally inwardly facing snubber elements carried by said frame side members opposed by laterally outwardly facing stop elements carried by each of said bolster arms to limit the lateral movement of said bolster with respect to said truck frame.

References Cited in the file of this patent

UNITED STATES PATENTS

| | | |
|---|---|---|
| 2,081,998 | Hallquist et al. | June 1, 1937 |
| 2,167,125 | Pflager | July 25, 1939 |
| 2,173,725 | Pflager | Sept. 19, 1939 |
| 2,295,553 | Cottrell | Sept. 15, 1942 |
| 2,638,058 | Williams | May 12, 1953 |
| 2,652,001 | Travilla et al. | Sept. 15, 1953 |
| 2,682,232 | Wulff | June 29, 1954 |